United States Patent [19]
Scott et al.

[11] Patent Number: 5,409,035
[45] Date of Patent: * Apr. 25, 1995

[54] AUTOMATIC SHUTOFF VALVE

[75] Inventors: William A. Scott, Mt. Zion, Ill.; Gary L. Baumbarger, Decatur, Ill.

[73] Assignee: Tillotson, Ltd., Tralee, Ireland

[*] Notice: The portion of the term of this patent subsequent to Mar. 29, 2011 has been disclaimed.

[21] Appl. No.: 178,065

[22] Filed: Jan. 6, 1994

Related U.S. Application Data

[63] Continuation of Ser. No. 930,735, Aug. 14, 1992, Pat. No. 5,297,578.

[51] Int. Cl.6 .................................... F16K 31/365
[52] U.S. Cl. .................................... 137/510; 137/587; 137/907
[58] Field of Search ............ 137/509, 510, 483, 907, 137/587, 590

[56] References Cited

U.S. PATENT DOCUMENTS

| | | | |
|---|---|---|---|
| 2,318,157 | 5/1943 | Heiser | 137/907 X |
| 2,632,637 | 3/1953 | Stone | 137/510 X |
| 2,939,476 | 6/1960 | Absolon. | |
| 3,145,697 | 8/1964 | Barr et al. | 137/483 X |
| 3,370,577 | 2/1968 | Guetersloh et al. | |
| 3,746,036 | 7/1973 | DuBois et al. | 137/510 X |
| 3,783,848 | 1/1974 | Ranft et al. | 137/510 X |
| 3,886,969 | 6/1975 | Shira et al. | 137/510 X |
| 4,633,901 | 1/1987 | Brandt et al. | |
| 5,083,546 | 1/1992 | Detweiler et al. | 137/907 X |

Primary Examiner—Stephen M. Hepperle
Attorney, Agent, or Firm—Harness, Dickey & Pierce

[57] ABSTRACT

A fuel supply system for supplying fuel from a fuel source to an internal combustion engine includes a valve assembly having a shut-off valve automatically responsive to negative pressures transmitted from an engine. The shutoff valve is diaphragm responsive and moves in the same direction as the flow of fuel in order close the valve assembly, thereby retaining the content of a fuel receptacle infinitely. The shutoff valve is adapted to withstand pressures which may develop in a fuel receptacle without opening.

7 Claims, 2 Drawing Sheets

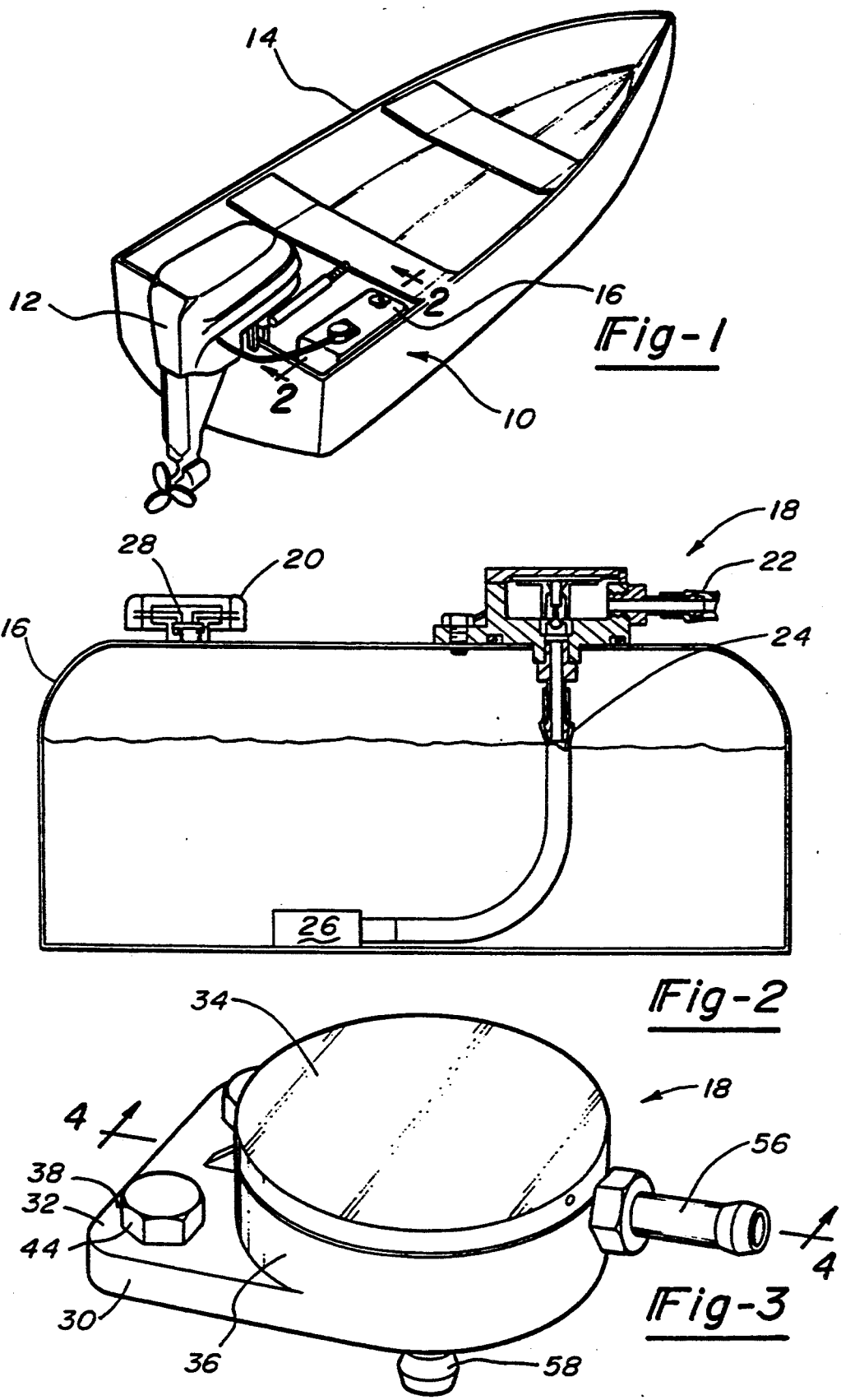

AUTOMATIC SHUTOFF VALVE

This is a continuation of U.S. patent application Ser. No. 07/930,735, filed Aug. 14, 1992, now U.S. Pat. No. 5,297,578.

BACKGROUND AND SUMMARY OF THE INVENTION

The present invention relates generally to an automatic shutoff valve. More particularly, the present invention relates to a valve and fuel tank assembly for controlling fuel vapor from entering the atmosphere during operation or shutdown of a fuel supply system.

In a typical fuel supply system, such as a fuel supply system associated with gasoline powered engines, it is desirable to seal the fuel outlet while the engine is shut down, thereby prohibiting harmful vapor as well as inadvertent fuel to escape into the atmosphere. Further, in a typical fuel supply system, it is desirable that the fuel outlet be responsive to a vacuum created in the fuel line.

In order to prohibit vapor and fuel from egressing from the fuel receptacle while not in use, many techniques have previously been employed. For example, in the most simple mechanical scenario, a valve can easily be incorporated which can be manually closed. While this technique is effective, it is inherently associated with numerous drawbacks including, but not limited to, operator error or forgetfulness and inconvenience, especially where the fuel source is remotely located relative to the engine controls.

It has also been previously proposed to provide a valve for a fuel receptacle which is responsive above a predetermined negative pressure or vacuum on the engine side of the valve. However, such valves heretofore incorporated can be opened by a positive pressure equal in magnitude located on the fuel receptacle side of the valve. This makes the tank susceptible to pop-off or breakaway when the receptacle contents exceeds a given pressure, and thereby allows fuel and vapor to be released into the atmosphere.

Accordingly, it is desired to provide a valve design which overcomes the above-discussed problems inherently associated with the prior art by providing an improved valve for fuel supply systems that automatically opens in response to negative pressure on the engine side of the valve, but will not open in response to positive pressure produced on the fuel receptacle side of the valve. The present invention provides such a valve for use in supplying fuel from a fuel source to an internal combustion engine.

Thus, it is a principal object of the present invention to provide an assembly for a fuel supply system which is responsive to negative pressure produced by the engine, but which is resistant to positive pressures which may develop in a fuel receptacle.

It is a related object of the present invention to provide an assembly for a fuel supply system which automatically prohibits vapor from escaping from a fuel receptacle upon engine shutoff.

It is yet another object of the present invention to provide a fuel supply assembly which vents to atmosphere in one direction during engine operation and seals the fuel and fuel vapor from entering atmosphere during engine operation as well as during engine shut down.

It is yet a further object of the present invention to provide an assembly through which the fuel flows in the same direction as the valve moves to shut off flow through the assembly, so that pressure will be contained infinitely.

From the subsequent detailed description taken in conjunction with the accompanying drawings and subjoined claims, other objects and advantages of the present invention will become apparent to those skilled in the art.

BRIEF DESCRIPTION OF THE DRAWINGS

Other objects and advantages of the present invention will become more apparent to those skilled in the art from the following detailed description of the preferred embodiment and from the attached drawings in which:

FIG. 1 illustrates a front perspective view of an assembly and system constructed in accordance with the teachings of the present invention shown in operative association with a conventional outboard motor;

FIG. 2 is a cross-sectional view of the assembly and system of FIG. 1 taken through the line 2—2 of FIG. 1;

FIG. 3 is a perspective front view of the assembly of FIG. 1;

DETAILED DESCRIPTION OF THE PREFERRED EMBODIMENT

Figure 4:
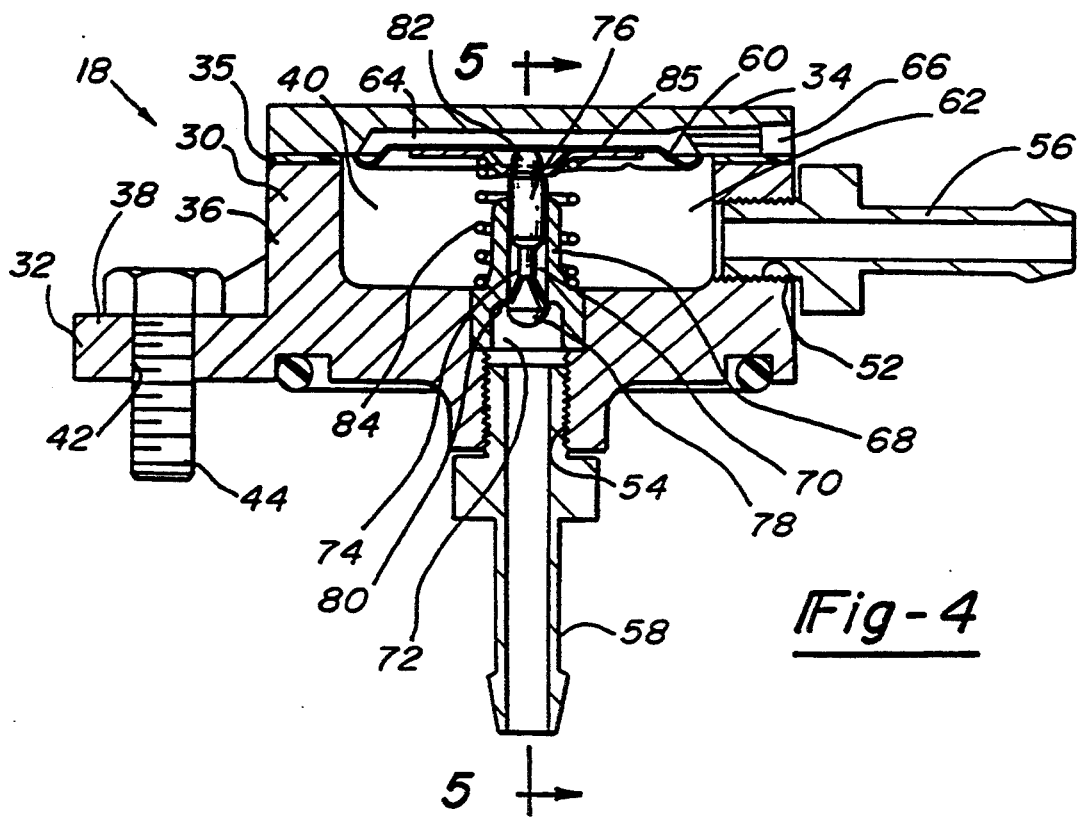
FIG. 4 is a cross-sectional view taken through the line 4—4 of FIG. 3 illustrating the valve in its closed position.

As generally shown in FIG. 1, the fuel supply system 10 of the present invention is shown in operative association with an outboard motor 12. It will be appreciated by those skilled in the art that the illustrated use is merely exemplary and the teachings of the present invention are equally applicable to fuel systems for fuel tanks mountable on garden tractors, riding lawnmowers, or any like gasoline powered device which typically uses an atmospheric vent fuel tank.

Referring to FIGS. 1 and 2, the fuel supply system 10 of the present invention is shown operatively connected to an outboard motor 12 of a boat 14. The fuel supply system 10 comprises a fuel receptacle 16, a valve assembly 18 and a removable cap 20. The valve assembly 18 is attached to a first conduit 22 which provides fluid communication between the valve assembly 18 and the motor 12. The valve assembly 18 is additionally attached to a second conduit 24 which serves to fluidly communicate the valve assembly 18 with a fuel filter 26 located at the bottom of the fuel receptacle 16. As will become more apparent below, the valve assembly 18 is adapted to be automatically responsive to negative pressures or vacuum produced by the motor 12 and transmitted through the first conduit 22. The valve assembly 18 is further adapted to remain closed despite the buildup of positive pressures in the fuel receptacle 16 which may be transferred through the second conduit 24.

The cap 20 of the fuel supply system 10 of the present invention is removable, thereby providing access to fill the receptacle 16. The cap 20 includes a positive shutoff check valve 28 which permits air to enter the receptacle 16 through the cap 20 in order to replace fuel which is removed during operation of the motor 12. The positive shutoff check valve 28 prohibits fuel or vapor from exiting the fuel receptacle 16 via the cap 20, thereby retaining content within the receptacle 16 infinitely.

Figure 5:
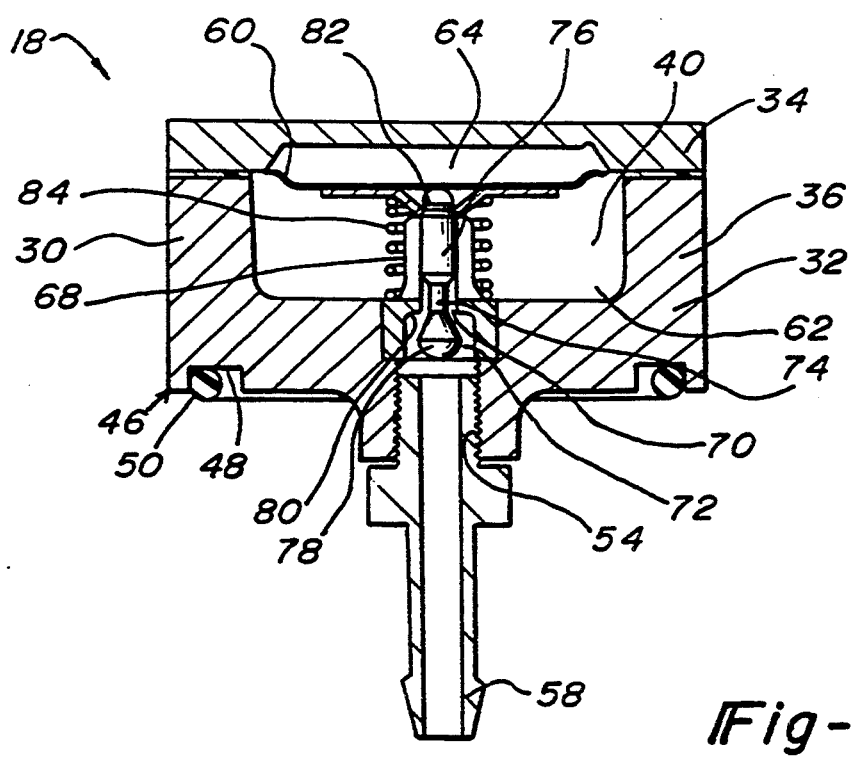
FIG. 5 is a cross-sectional view taken through the line 5—5 of FIG. 4 illustrating the valve in its open position.

Turning next to FIGS. 3-5, the valve assembly 18 of the present invention will be described in greater detail. The valve assembly 18 comprises a valve body 30 which is of a two-piece construction having a first, or base portion 32 and a second, or cap portion 34. In the preferred embodiment, the base portion 32 and cap portion 34 of the valve body 30 are molded of a plastic material and are suitably joined together with fastening means such as adhesive or bolts (not shown). Construction of the base and cap portions 32, 34 from molded plastic allows for manufacturing without machining, thereby considerably decreasing the forming operations and also decreasing the production costs associated with the valve assembly 18.

The first or base portion 32 of the valve body 30 includes an upwardly extending cylindrical wall portion 36 and a flange portion 38. The upwardly extending cylindrical wall portion 36 defines a body cavity 40 which will be described in further detail below. The flange portion 38 is integrally formed with the cylindrical wall portion 36 to axially extend from the lower part of the cylindrical wall portion 36. The flanged portion 38 is formed to include apertures 42 adapted to receive mounting bolts 44 used to affix the valve assembly 18 to the fuel receptacle 16. The valve assembly 18 further comprises an underside 46 which is formed to include a circular recess 48 adapted to receive an O-ring seal 50.

In the preferred embodiment, the valve assembly 18 is further formed to include first and second threaded apertures 52, 54 adapted to engageably receive an outlet fitting 56 and an inlet fitting 58, respectively. It will be appreciated by those skilled in the art that the outlet fitting 56 and inlet fitting 58 may alternatively be pressure fit or integrally formed with the valve body 30.

A diaphragm 60 is peripherally captured between the base and cap portions 32, 34 of the valve body 30, to thereby define a metering chamber 62 below the diaphragm 60, and an atmospheric chamber 64 above the diaphragm 60. The atmospheric chamber 64 is held at atmospheric pressure through exposure to the atmosphere through an aperture 66 in the cap portion 34 of the valve body 30, thereby facilitating movement of the diaphragm 60 in response to reduced pressures which, as discussed below, are transmitted to the metering chamber 62.

In the preferred embodiment, a semi-cylindrical hollow guide portion 68 is disposed substantially adjacent the inlet fitting 58 and extends upwardly into the metering chamber 62 of the body cavity 60. The guide portion 68 partially defines a channel 70 with an enlarged lower end 72 and a narrower upper end 74. Disposed within the guide portion 70 is an elongated shutoff valve 76. The shutoff valve 76 includes an enlarged head 78 adapted to seat on a valve seat 80 disposed between the upper and lower portions 72, 74 of the channel 70.

The elongated shutoff valve 76 is articulately connected at a first or upper end 82 to the diaphragm 60. An expansive coil spring 84 surrounds the guide portion 68 and extends the vertical length of the metering chamber 62 with a first end 85 disposed adjacent the diaphragm 60, thereby biasing the diaphragm upward and resultantly biasing the shutoff valve to its closed position (as shown in FIG. 4).

When negative pressure is present in the outlet fitting 56, as will be discussed fully hereinafter, and is communicated to the metering chamber 62 of the valve body 30, the diaphragm 60 is flexed downwardly, overcoming the force from the spring 84 and displacing the enlarged portion 78 of the shutoff valve 76 from a closed position (as shown in FIG. 4). The negative pressure then causes fuel to be drawn through the inlet fitting 58 into the metering chamber 62, and through the outlet fitting 56.

The operation of the fuel supply assembly 10 of the present invention as herein described is as follows.

As a gasoline powered motor 12 which is operatively associated with the fuel supply system 10 of the present invention is started, or continues to run, negative pressure or vacuum is produced which is transmitted through the first conduit 22 to the outlet fitting 56 and eventually to the metering chamber 62 of the body cavity 40. This vacuum flexes the diaphragm 60 downwardly causing the shutoff valve 76 to similarly translate downwardly, thereby opening the valve assembly 18 (as shown in FIG. 5). Fuel flow is correspondingly drawn through the inlet fitting 58 by the vacuum. As fuel is drawn through the valve assembly 18, the volume inside the fuel receptacle 16 is allowed to remain constant since the positive shutoff check valve 28 of the cap 20 allows air to be drawn into the fuel receptacle 16.

After the motor 12 is shut down, the vacuum ceases and the shutoff valve return spring 84 forces the diaphragm 60 upwardly, thereby drawing the elongated shutoff valve 76 upward to its closed position (FIG. 4). Since fuel flows through the assembly 18 in the same direction as the shutoff valve 76 moves to close the valve assembly 18, pressures will be contained infinitely, thereby controlling fuel evaporate emission to atmosphere to a more positive degree. The direction of the motion of the shutoff valve 76 is further significant since it enables the valve assembly 18 to withstand pressures which may develop in the fuel receptacle 16 without opening the valve assembly 18.

While it will be apparent to those skilled in the art that the preferred embodiment is well calculated to fulfill the above-stated objects, it will also be appreciated that the present invention is susceptible to modification, variation and alteration without departing from the scope and spirit of the claims as set forth below.

What is claimed is:

1. An assembly for a fuel supply system, the assembly comprising:

a housing defining a cavity;

a guide portion at least partially extending into said cavity, said guide portion at least partially defining a cylindrical channel having an upper end, a lower end and a seating wall portion disposed therebetween, said lower end having a first diameter and said upper end having a second diameter;

a fuel inlet in communication with said cavity;

an elongated valve member disposed substantially within said guide portion, said elongated valve member being moveable in a first direction to an open position and in a second direction to a closed position, said elongated valve member including a sloping wall portion adapted to seat against the seating wall portion;

a diaphragm connected to said valve member; and a spring surrounding said guide portion and being disposed adjacent said diaphragm.

2. The assembly of claim 1, wherein said spring is adapted to bias said valve member toward said closed position.

3. The assembly of claim 1, wherein said housing includes first and second portions, and further wherein said diaphragm is peripherally captured between said first and second portions.

4. The assembly of claim 1, wherein said first diameter is greater than said second diameter and further wherein said sloping wall portion uniformly tapers from a maximum diameter greater than said second diameter to a minimum diameter less than said second diameter.

5. The assembly of claim 1, wherein said second direction is toward said inlet.

6. The assembly of claim 3, wherein said diaphragm divides said cavity into an atmosphere chamber and a metering chamber.

7. The assembly of claim 6, wherein said diaphragm is responsive to reduced pressures transmitted to said metering chamber.

* * * * *